United States Patent [19]
d'Auria et al.

[11] 4,193,661
[45] Mar. 18, 1980

[54] OPTICAL MULTICHANNEL COUPLER

[75] Inventors: Luigi d'Auria; Jacques Dubos; Andre Jacques, all of Paris, France

[73] Assignee: Thomson-CSF, Paris, France

[21] Appl. No.: 899,587

[22] Filed: Apr. 24, 1978

[30] Foreign Application Priority Data

Apr. 29, 1977 [FR] France .................. 77 12954

[51] Int. Cl.² .................................................. G02B 5/16
[52] U.S. Cl. ................................. 350/96.16; 350/96.15; 350/96.22
[58] Field of Search ............... 350/96.16, 96.15, 96.21, 350/96.22

[56] References Cited

U.S. PATENT DOCUMENTS

| | | | |
|---|---|---|---|
| 3,874,780 | 4/1975 | Love | 350/96.16 |
| 3,874,781 | 4/1975 | Thiel | 350/96.16 |
| 3,937,557 | 2/1976 | Milton | 350/96.16 |
| 4,124,271 | 11/1978 | Green | 350/96.22 |
| 4,125,315 | 11/1978 | Altman et al. | 350/96.15 |

*Primary Examiner*—Stewart J. Levy
*Attorney, Agent, or Firm*—Cushman, Darby & Cushman

[57] ABSTRACT

A multichannel coupler for connecting a plurality of input fibers to a plurality of output fibers which comprises a mixing fiber coupled to the pluralities of fibers. This mixing fiber is cut along a transversal cut and the two parts thus obtained are secured end to end. At least one of the surfaces delimiting the cut is ground for having a better distribution of the transmitted light onto the output fibers.

4 Claims, 4 Drawing Figures

OPTICAL MULTICHANNEL COUPLER

This invention relates to multichannel couplers used in links using optical fibers. These couplers enable a plurality of emitting fibers to be connected to a plurality of receiving fibers in such a way that all the receiving fibers receive the radiation emitted by at least one of the emitting fibers.

It is necessary to connect the optical fibers both to one another and to the apparatus which they connect by means of connectors which are as easy to use as conventional electronic connectors.

These optical fibers generally consists of a bundle of individual fibers of very small diameter, particularly to ensure that the breakage of one individual fiber does not endanger the link as a whole. The end-to-end connection of these bundles is very difficult and their uniform coupling to the emitting devices (light-emitting diodes for example) involves delicate operations.

In their now abandoned French application Ser. No. 35099/1976 filed on Mar. 19, 1976 under the title "A detachable connection device for opto-electrical links using bundles of optical fibers", Applicants disclosed the placing of a single fiber of large diameter enabling such a connection or coupling, in a connector similar to those commonly used in electronic apparatus. The diameter of this single fiber is substantially equal to the diameter of the bundle of individual fibers forming the optical connecting fiber and to the diameter of the active parts both of the emitting source and of the receiving cell.

The length of this single fiber is selected to enable the luminous radiation emanating from each of the individual fibers or from each of the points of the source disposed on its input surface to be distributed over its entire output surface.

In their French application Ser. No. 118529/1977 filed on Oct. 1, 1977 under the title "Multichannel coupler for fibre optic links", Applicants also disclosed the use of such a connector containing a single fiber of large diameter for simultaneously interconnecting several emitting optical fibers and several receiving optical fibers, these optical fibers themselves consisting of one or more individual fibers. Effectively in the same way as in a single-channel connector, the radiation emanating from a single individual fiber of the optical in-put fiber is distributed over all the individual fibers of the optical output fiber, the radiation emanating from one of the optical input fiber in such a multichannel coupler is distributed over all the optical output fibers. Accordingly, the channels corresponding to these fibers are mixed together in this multichannel coupler and provide for example for a conversational link between several terminals.

However, the distribution of the luminous radiation is not uniform and, particularly the dispersion of the levels received over the same optical output fiber in dependence upon the optical input fiber used is by no means negligible. If this dispersion d is defined as the difference in decibels between the maximum optical power $P_M$ and the minimum optical power $P_m$ received by the same optical fiber, then:

$$d = 10 \log P_M/P_m$$

the measurements show that the dispersion obtained is no better than 4 dB.

Hudson and Thiel published results of the same order of magnitude in an Article published in "Applied Optics", Vol. 13, No 11 of November, 1974, pages 2540-2545. These results were obtained by using a process of random distribution of the individual fibers of the bundles and it should be noted that such a process is difficult to reproduce in an industrial production.

In accordance with the present invention, there is provided a multichannel coupler for coupling a plurality of input optical fibers to a plurality of output optical fibers, which comprises:

a mixing fiber divided into two parts; a cut substantially perpendicular to the axis of said mixing fiber separating said two parts, and two opposite surfaces ending respectively said two parts delimiting said cut; and at least one of said surfaces being ground;

means for coupling said input optical fibers to one of said parts; and means for coupling said output optical fibers to the other of said parts.

For a better understanding of the invention, and to show how the same may be carried into effect, reference will be made to the ensuing description and to the attached figures among which:

FIG. 1 illustrates a partial section along a longitudinal plane of symmetry through a coupler according to the invention which may be used for connecting 7 incoming channels to 7 outgoing channels.

Figure 1:
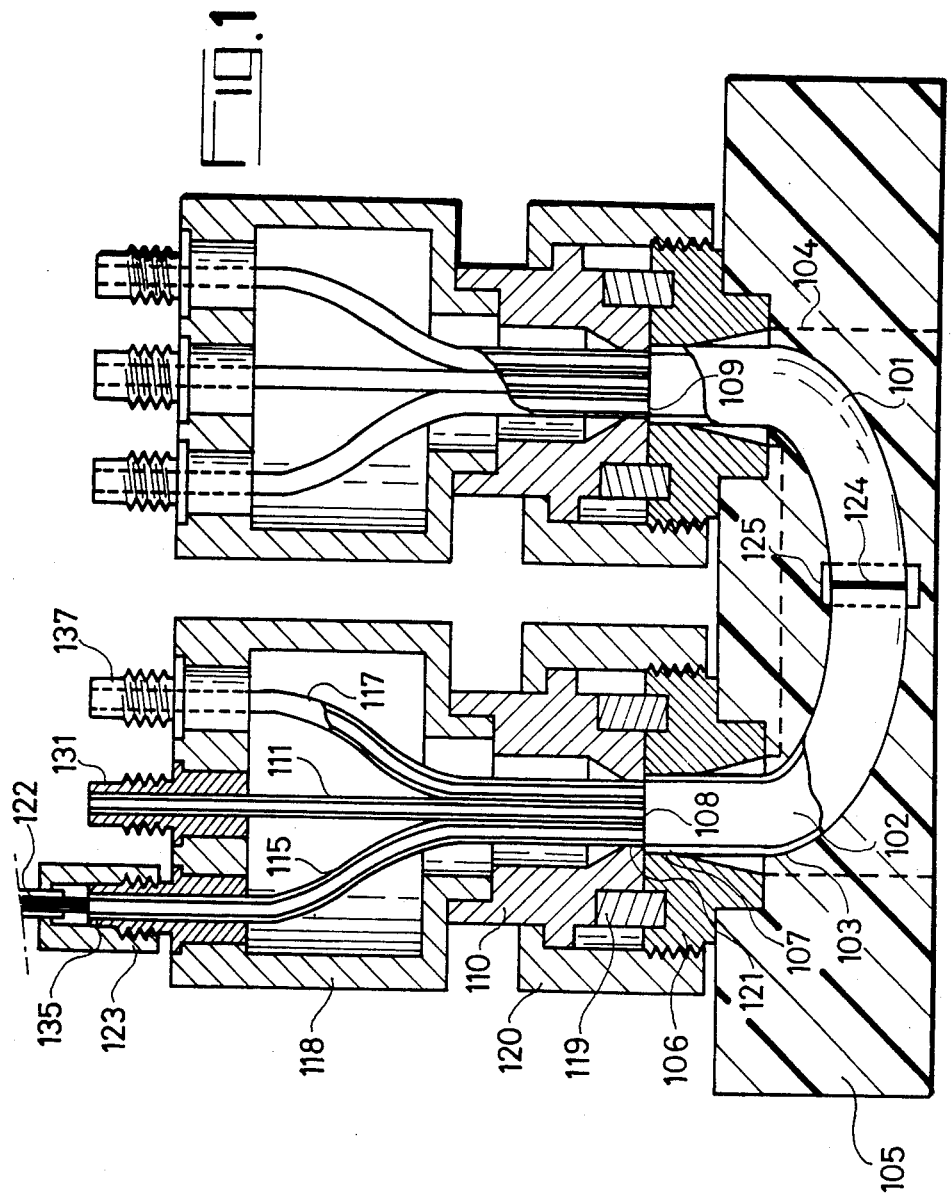
FIG. 1 illustrates a cross-section through a U-shaped coupler.

A mixing fiber 101 comprising a core 102 and a cladding 103 is placed in a cavity 104 of a support 105. This cavity is then filled with a polymerisable liquid and its contour is only distinguishable in the Fig. by dotted lines 104. At its ends, the fiber is held by two identical screw-threaded male elements 106 each formed with an axial opening 107 and fixed to the support 105.

On the terminal surfaces 108 and 109 of the fiber 101 there are disposed two identical intermediate assemblies each comprising seven intermediate fibers 111 to 117 of which only three are visible in Fig. for each assembly. These intermediate fibers also comprise a core and a cladding and are disposed in a hexagonal disposition around the central fiber 111. This disposition is compact on the surfaces 108 and 109 which are covered to the maximum, and it opens out on the other side to allow easy individual access to the free ends of the intermediate fibers.

Each assemblage of intermediate fibers is held in a support formed by two elements 110 and 118 fitted into one another. A ring 119 enables the element 110 to be centered relative to the element 106 and a locking ring 120 enables the support for the intermediate fibers to be fixed to the support 105 by way of the element 106. The element 110 is formed with a bore 121 which is substantially equal in diameter to the core of the fiber 101 and which enables the first ends of the intermediate fibers to be kept in a compact disposition. The second ends of the intermediate fibers lead to standard male connections 131 to 137 which are fixed to the front surface of the element 118 and which enable each of the incoming or outgoing optical links to be individually connected. The end of only one such channel has been drawned as an illustration, comprising a bundle of optical fibers 122 connected to the intermediate fiber 115 by a female connection 123 screwed onto the male connection 135.

The mixing fiber 101 of this coupler comprises two parts separated by a ground cut 124 which is made substantially perpendicularly to the axis of the fiber and which is situated approximately at its center. These two parts are joined by a ring 125 which surrounds them fairly closely to prevent the liquid filling the cavity 104 from penetrating between the two opposite surfaces of the cut before it is polymerised. At least one of these two surfaces has been ground by a process (for example sanding) enabling a grain size of the order of 10 microns to be obtained.

The presence of this ground cut results in a diffusion of the luminous radiation which is propagated through the fiber 101. This diffusion enhances the mixing effect of the fiber, but produces a slight additional insertion loss.

In one particular embodiment of this coupler, a maximum dispersion of less than 1.5 dB was obtained for a gain size of the ground surface of approximately 9.5 $\mu$m. The additional losses did not exceed 1.5 dB.

Figure 3:
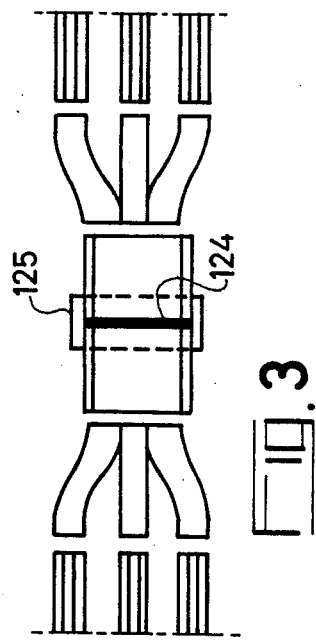
FIGS. 2 to 4 illustrates diagrammatically sections through over embodiments of such couplers.
Figure 2:
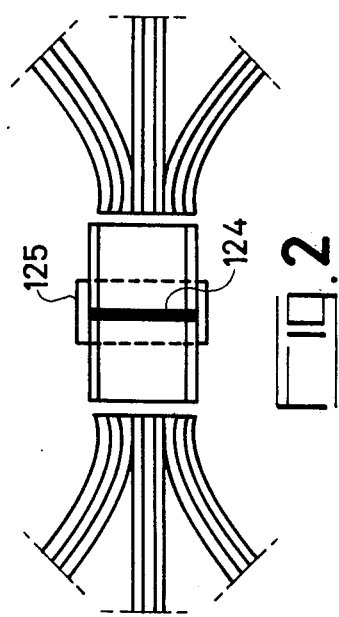
Figure 4:
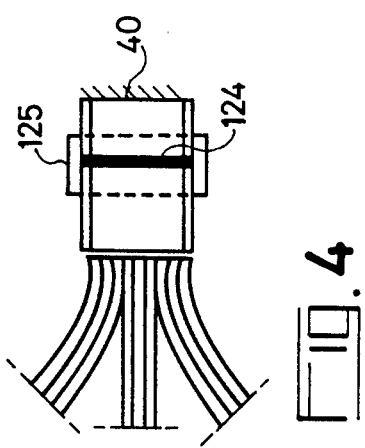

The insertion of such a ground cut is by no means limited to the case of the U-shaped multichannel coupler described above. It can be used in any device comprising a mixing fiber and, particularly, in the gathered-bundle linear-fiber coupler illustrated in FIG. 2, to the separate-bundle linear-fiber coupler illustrated in FIG. 3 and to the mirror coupler illustrated in FIG. 4.

In this case of coupler comprising a mirror 40, a preferred embodiment is to metallise one end of the fiber.

In the case of gathered-bundle or separate-bundle linear fiber couplers, the maximum dispersion was reduced to less than 2.7 dB for a gain size of the ground surface of approximately 22.5 $\mu$m.

What we claim is:

1. A multichannel coupler for coupling a plurality of input optical fibers to a plurality of output optical fibers, which comprises:

a mixing fiber U-shaped for having its two ends substantially in a same plane, and divided into two parts; a cut substantially perpendicular to the axis of said mixing fiber separating said two parts, and two opposite surfaces ending respectively said two parts delimiting said cut; and at least one of said surfaces being ground with a grain size approximately equal to 9.5 $\mu$m;

a ring for holding end-to-end said two opposite surfaces and preventing extraneous foreign bodies from being introduced into said cut;

means for coupling said input optical fibers to one of said parts; and means for coupling said output optical fibers to the other of said parts.

2. A multichannel coupler for coupling a plurality of input optical fibers to a plurality of output optical fibers, which comprises:

a mixing fiber substantially linear, and divided into two parts; a cut substantially perpendicular to the axis of said mixing fiber separating said two parts, and two opposite surfaces ending respectively said two parts delimiting said cut; and at least one of said surfaces being ground with a grain size approximately equal to 22.5 $\mu$m;

a ring for holding end-to-end said two opposite surfaces and preventing extraneous foreign bodies from being introduced into said cut;

means for coupling said input optical fibers to one of said parts; and means for coupling said output optical fibers to the other of said parts.

3. A multichannel coupler for coupling a plurality of input optical fibers to a plurality of output optical fibers, which comprises:

a mixing fiber substantially linear, and divided into a first and a second part; two first surfaces ending said first part and two second surfaces ending said second part; a cut substantially perpendicular to the axis of said mixing fiber and delimited by one of said first surfaces and one of said second surfaces, separating said two parts; and at least one of the surfaces delimiting said cut being ground, with a grain size approximately equal to 22.5 $\mu$m;

a mirror placed onto the other of said second surfaces.

4. A coupler as claimed in claim 3, wherein said mirror is made by coating said other second surface with reflecting metal.

* * * * *